(12) United States Patent
McDonald et al.

(10) Patent No.: US 9,937,446 B1
(45) Date of Patent: Apr. 10, 2018

(54) MECHANISMS AND SYSTEMS FOR DIRECTING WATER FLOW IN A FLUID CONTAINER

(71) Applicant: Brita LP, Oakland, CA (US)

(72) Inventors: Jonathan McDonald, Pleasanton, CA (US); Edward B. Rinker, Pleasanton, CA (US)

(73) Assignee: Brita LP, Oakland, CA (US)

( * ) Notice: Subject to any disclaimer, the term of this patent is extended or adjusted under 35 U.S.C. 154(b) by 497 days.

(21) Appl. No.: 14/339,528

(22) Filed: Jul. 24, 2014

Related U.S. Application Data

(60) Provisional application No. 61/862,711, filed on Aug. 6, 2013, provisional application No. 61/893,389, filed on Oct. 21, 2013.

(51) Int. Cl.
*B65D 51/24* (2006.01)
*C02F 1/00* (2006.01)
*B01D 29/085* (2006.01)

(52) U.S. Cl.
CPC ............ *B01D 23/28* (2013.01); *B65D 51/24* (2013.01); *C02F 1/003* (2013.01); *C02F 2307/04* (2013.01)

(58) Field of Classification Search
None
See application file for complete search history.

(56) References Cited

U.S. PATENT DOCUMENTS

| | | | |
|---|---|---|---|
| 4,969,996 A | 11/1990 | Hankammer | |
| 5,219,525 A * | 6/1993 | Harrison | G01N 1/4077 210/238 |
| 5,518,620 A | 5/1996 | Eguchi et al. | |
| 5,980,743 A | 11/1999 | Bairischer | |
| 6,103,114 A | 8/2000 | Tanner et al. | |
| 6,254,768 B1 | 7/2001 | Dulieu et al. | |
| 6,383,381 B1 | 5/2002 | O'Flynn et al. | |
| 6,638,426 B1 | 10/2003 | Fritter et al. | |
| 8,043,502 B2 | 10/2011 | Nauta | |
| 8,202,418 B2 | 6/2012 | Wallerstorfer et al. | |
| 8,216,465 B2 | 7/2012 | Nauta | |
| 8,388,841 B2 | 3/2013 | Moretto | |
| 2003/0159979 A1 * | 8/2003 | Chau | A47J 31/605 210/282 |
| 2006/0000763 A1 | 1/2006 | Rinker et al. | |
| 2010/0307986 A1 | 12/2010 | Alexandrou | |
| 2014/0144829 A1 * | 5/2014 | Takeda | B01D 61/18 210/295 |

FOREIGN PATENT DOCUMENTS

| | | |
|---|---|---|
| WO | WO9817582 | 4/1998 |
| WO | WO9832705 | 7/1998 |
| WO | WO 2011/145646 | * 11/2011 |
| WO | WO14014789 | 1/2014 |

* cited by examiner

*Primary Examiner* — Benjamin M Kurtz
(74) *Attorney, Agent, or Firm* — Thomas C. Feix

(57) ABSTRACT

In one example, a flume is provided that is suitable for use in connection with a filter cartridge of a water filtration system. The flume includes a hollow body that can be received within a chassis of a pitcher, and the hollow body further includes an inlet and an outlet. Flume surfaces within the hollow body cooperate to at least partly define a fluid passage extending from the inlet to the outlet. A contact portion of the flume is located proximate the outlet and engageable with a filter cartridge such that when the contact portion is engaged with the filter cartridge, a portion of the filter cartridge engaged by the flume is located outside of the fluid passage.

15 Claims, 18 Drawing Sheets

MECHANISMS AND SYSTEMS FOR DIRECTING WATER FLOW IN A FLUID CONTAINER

RELATED APPLICATIONS

This application hereby claims priority to: U.S. Provisional Patent Application Ser. 61/862,711, entitled FILTER RETAINING FLUME, and filed Aug. 6, 2013; and, U.S. Provisional Patent Application Ser. 61/893,389, entitled PROTRUSION-FILTER SYSTEM, and filed Oct. 21, 2013. All of the aforementioned applications are incorporated herein in their respective entireties by this reference.

This application is related to the following United States Patent Applications, all of which are filed the same day herewith and incorporated herein in their respective entireties by this reference: U.S. patent application Ser. No. 14/339,517, entitled MECHANISMS AND SYSTEMS FOR FILTER SEATING; U.S. patent application Ser. No. 14/339,521, entitled INTERMEDIATE ADAPTER FOR FILTER SEATING; and, U.S. patent application Ser. No. 14/339,535, entitled WATER PITCHER SYSTEM.

FIELD OF THE INVENTION

Embodiments of the present invention generally concern water filtration systems for pitchers and other fluid containers. More particularly, embodiments of the invention relate to devices for seating, aligning, and/or retaining a filter element in a reservoir or other container, and for directing fluid flow within the container.

BACKGROUND

Water filtration has become common in homes, offices and other places to produce cleaner and better tasting water. One popular filtration system is used in conjunction with a water pitcher. Some water pitchers include an upper chamber for holding untreated water and a lower chamber for holding treated water that has exited the upper chamber. A filter cartridge is placed in a fluid path between the two chambers so that untreated water exits the upper chamber through the filter cartridge and enters the lower chamber as filtered water.

The filter cartridge includes openings that allow unfiltered water to enter the interior of the filter cartridge where the unfiltered water comes into contact with a filtering medium that acts to remove contaminants from the water as the water flows through the interior of the filter cartridge. After filtering is completed, the filtered water exits the filter cartridge into the lower chamber. As a result, treated water is available and ready to be poured from the water pitcher for consumption by a user.

The filter cartridge typically resides in a receptacle defined by a candle that is located at the bottom of the upper chamber and that is open to both the upper and lower chambers. Absent the filter cartridge, water can flow from the upper chamber to the lower chamber by way of the candle. With proper alignment and seating of the filter cartridge within the candle, water can only flow from the upper chamber to the lower chamber through the filter cartridge. Typically, the filter cartridge is removable so that after the usable life of the cartridge, it may be removed and replaced with a new filter cartridge.

Placement of the filter cartridge within the candle of the water pitcher is important for proper water treatment. In order to place the cartridge, the user typically must maneuver the filter cartridge so that the filter cartridge is firmly seated and properly aligned within the candle. If the filter cartridge is properly aligned and seated within the candle, a fluid tight seal, or substantially fluid tight seal, is formed between the candle and the exterior of the filter cartridge such that water can only flow from the upper chamber to the lower chamber through the filter cartridge.

In practice however, achievement of proper seating of the filter cartridge has proven problematic. This is due at least in part to the construction of typical water pitchers and, more particularly, the relation between various elements of the water pitcher.

For example, one problem is that proper alignment and seating of the filter cartridge in the candle requires focused effort on the part of the user. That is, proper alignment and seating of the filter cartridge generally cannot be achieved by simply dropping the filter cartridge into the candle. Instead, the user must perform an extra action to properly align the filter cartridge with respect to the candle, and then seat the filter cartridge within the candle.

In particular, after aligning the filter cartridge so that it can be received within the candle with the proper angular orientation, the user must also push the filter cartridge downward into the candle so that a fluid tight seal, or substantially fluid tight seal, is formed between the filter cartridge and the filter seat in the candle. Users often neglect to perform this necessary step and, as a result, the filter cartridge may be aligned but not properly seated, even though it can appear so to the user. This problem is further aggravated by the fact that typical filtration systems lack any sort of feedback mechanism that indicates to the user that the filter cartridge is properly seated.

Misalignment and/or improper seating of the filter cartridge, as described above, can present a variety of problems with respect to the operation of the filtration system. Among other things, misalignment and/or improper seating of the filter cartridge can result in a gap between the filter cartridge and the filter seat, thus allowing untreated water to bypass the interior of the filter cartridge and flow into the lower chamber, thereby introducing contaminants into the water held in the lower chamber.

Another problem with many filtration systems is that even if the filter cartridge is initially placed in the correct alignment and is properly seated in the candle, the filter cartridge may not be reliably retained in that position. For example, the filter cartridge can move out of position as a result of repeated use of the water pitcher, such as when the water pitcher is tipped to pour treated water from the lower chamber. That is, the tipping motion may act to change the position of the filter cartridge relative to the candle. Moreover, repeated tipping may also cause the filter cartridge to move partly, or completely, out of the candle.

In either case, the seal between the exterior of the filter cartridge and the candle has been compromised. Consequently, the next time the upper chamber is filled, untreated water can bypass the filter cartridge and flow directly into the lower chamber, thus contaminating the filtered water in the lower chamber.

Yet another concern with many filtration systems relates to the construction and placement of the filter cartridge. For example, filter cartridges often include a set of air vents at, or near, the top of the filter cartridge which allow air in the filter cartridge to escape as fluid flows into the filter cartridge. However, many filtration systems are constructed in such a way that as water is poured into the upper chamber, the incoming water directly impinges upon the air vents, effectively blocking the air vents and thus preventing the escape of air from the filter cartridge. Because air is prevented from escaping the filter cartridge, a static, or near static, condition results where water cannot easily enter the filter cartridge. This condition is sometimes referred to as airlock and slows the rate at which water flows through the filter cartridge.

A further problem that affects many filtration systems relates to the placement of the filter cartridge and the filtration media employed in the filter cartridge. For example, and as noted above, the filter cartridge is often located in a position where water entering the upper chamber impinges upon the filter cartridge air vents. As the in rushing water enters the air vents, the relatively high velocity of that water causes disturbance of the filtration media within the filter cartridge. This disturbance reduces the overall effectiveness of the filtration media. Disturbed filtration media also presents increased resistance to the fluid that is to be filtered, such that the fluid is not able to readily flow through the filtration media.

In light of problems such as those noted above, it would be useful to provide a device that ensures proper seating of a filter cartridge that is placed within a water pitcher. As well, it would be useful for the device to retain the filter cartridge in place, once properly positioned, during use of the pitcher, or other device, that includes the filter cartridge. Finally, it would be useful to avoid, or at least reduce, airlock of the filter cartridge, and media disturbance.

SUMMARY OF AN EXAMPLE EMBODIMENT

One or more embodiments within the scope of the invention may be effective in overcoming one or more of the disadvantages in the art. One example embodiment is directed to a water pitcher that includes a flume that helps to ensure proper seating of a filter cartridge, and also helps to maintain the filter cartridge alignment and seating during use of the water pitcher. As well, the flume directs an inflow of untreated water away from the air vents of the filter cartridge so as to help avoid, or at least reduce, problems such as media disturbance and airlock.

The water pitcher includes a candle in which a filter cartridge can be removably positioned. A filter seat is provided within the candle to interface with the filter cartridge in such a way that a seal is established between the filter cartridge and the filter seat. The candle is configured and arranged for fluid communication with both an untreated water reservoir, and a treated water reservoir, of the water pitcher so that water exiting the untreated water reservoir is able to pass through the filter cartridge, when present in the candle, and enter the treated water reservoir.

As suggested above, the flume can help to seat the filter cartridge, and retain the filter cartridge in that seated position. More particularly, the flume is generally configured and arranged to exert a force on the filter cartridge in a direction and magnitude such that, if the filter cartridge is not already properly seated on the filter seat, the filter cartridge will be moved into a sealing contact with the filter seat.

Moreover, the flume may directly contact the filter cartridge, although that is not required and, alternatively, one or more intervening structures can be used to transfer a force exerted by the flume to the filter cartridge. Where one or more such intervening structures are present, the flume is considered to be in indirect contact with the filter cartridge. The flume can take any form or configuration consistent with its function and so is not constrained to any particular form or configuration.

In this example embodiment, the flume is positioned between a cover of the water pitcher and the top of the filter cartridge, such as by attachment to the cover for example, so that as part of a process in which a user attaches the cover to an untreated water reservoir, or chassis, the flume exerts a force, either directly or indirectly, on the filter cartridge. The exertion of this force moves the filter cartridge into sealing contact with the filter seat in the candle.

The flume need not remain in contact with the filter cartridge once the filter cartridge is in the sealing range of the candle. More generally, the flume can be positioned to prevent the filter cartridge from moving out of the sealing range. This can be accomplished either with the flume in contact with the filter cartridge, or with the flume spaced apart from the filter cartridge but positioned such that the filter cartridge is prevented by the flume from moving out of the sealing range.

In any case, assurance is provided to the user that when the cover is attached to the pitcher, the filter cartridge is properly seated and, as such, untreated water cannot bypass the filter. In connection with this embodiment, one or more components of the water pitcher can be configured to provide sensory feedback to the user so that the user can ascertain proper seating of the filter cartridge. For example, the cover can include structures that engage complementary structures on the unfiltered water reservoir of the pitcher so that a snap sound is produced when the cover is fully engaged with the unfiltered water reservoir. This cover configuration can also help to ensure that the cover remains closed, thereby maintaining the filter cartridge in the correct position and alignment, even when the water pitcher is tipped.

The foregoing embodiment is provided solely by way of example and is not intended to limit the scope of the invention in any way. Consistently, various other embodiments of a flume and associated filters and containers within the scope of the invention are disclosed herein.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1A:
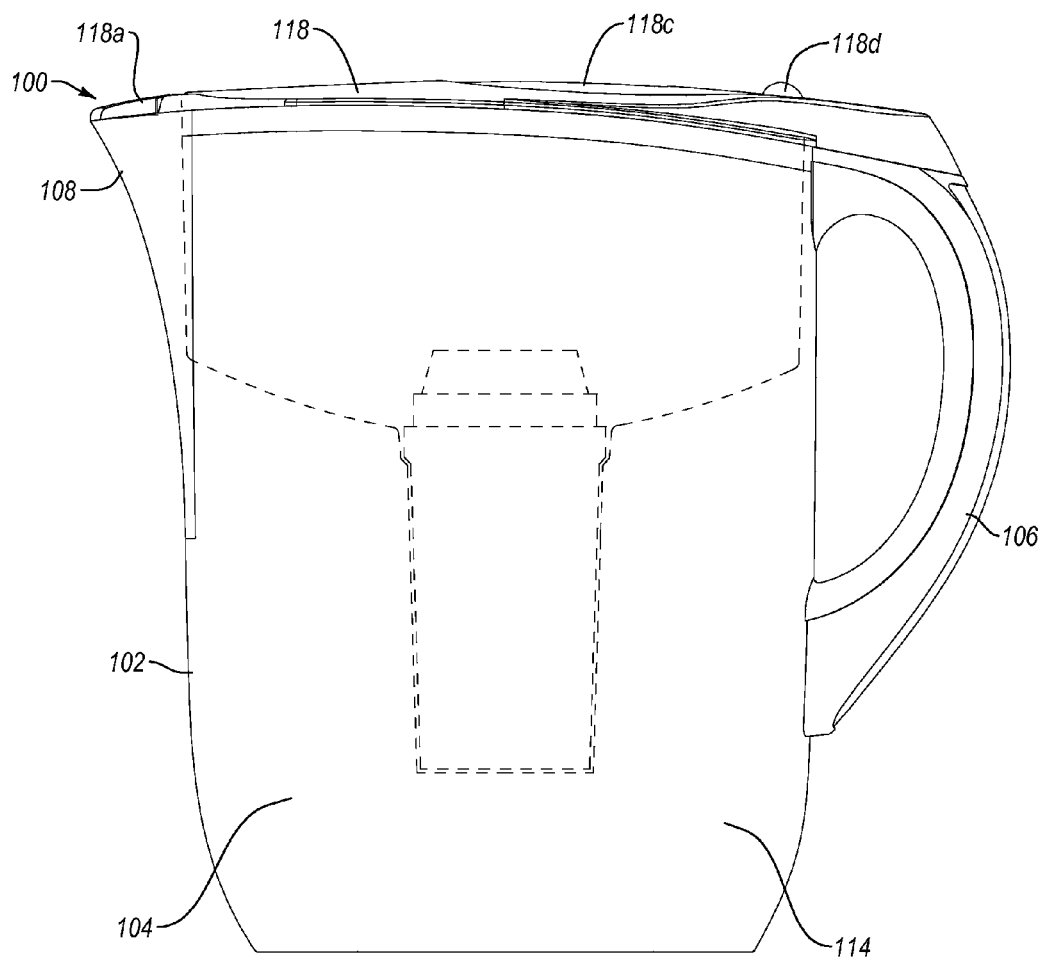
FIG. 1a is a perspective view of an example embodiment in the form of a water pitcher.
Figure 1B:
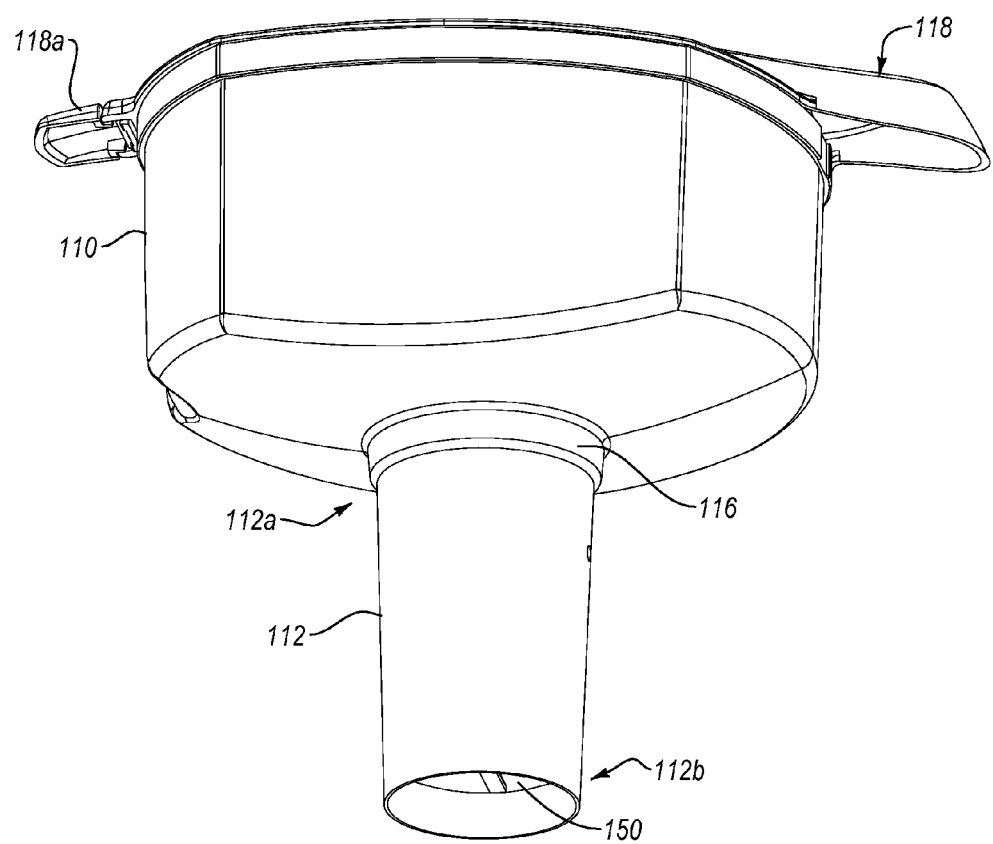
FIG. 1b is a side perspective view of an example untreated water reservoir and cover.
Figure 1C:
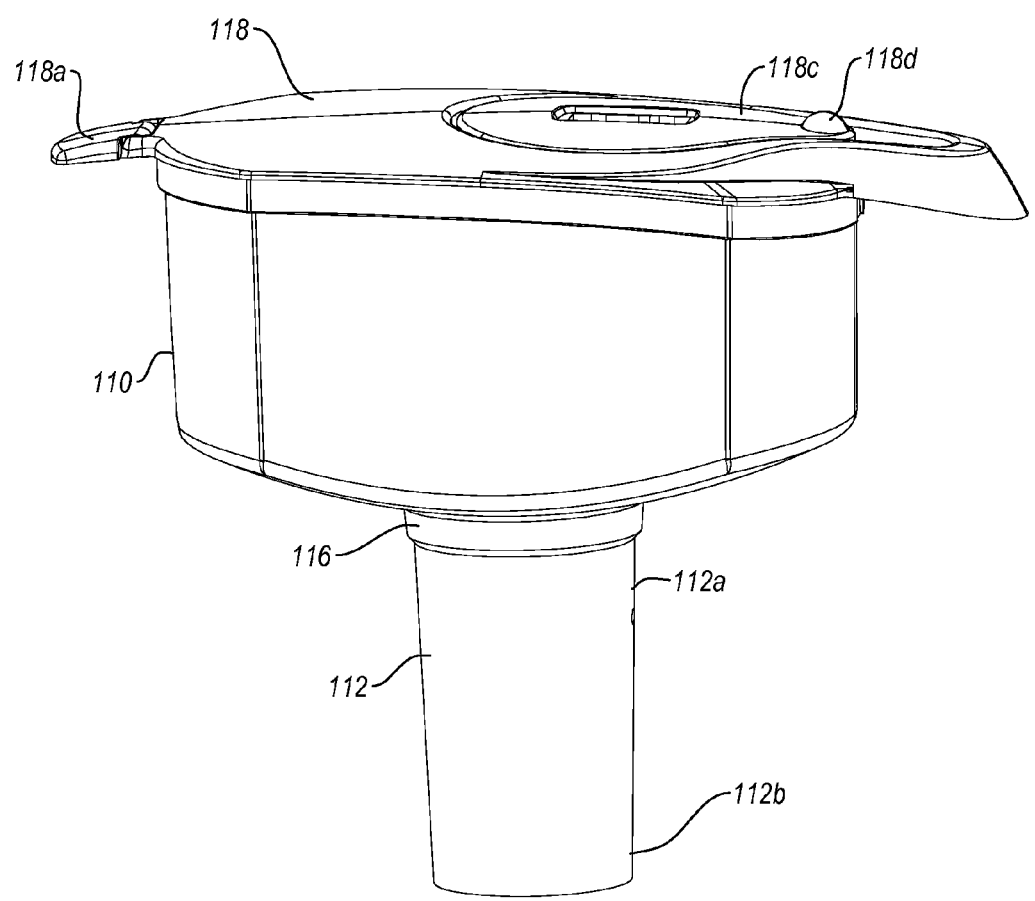
FIG. 1c is another side perspective view of an example untreated water reservoir and cover.
Figure 1D:
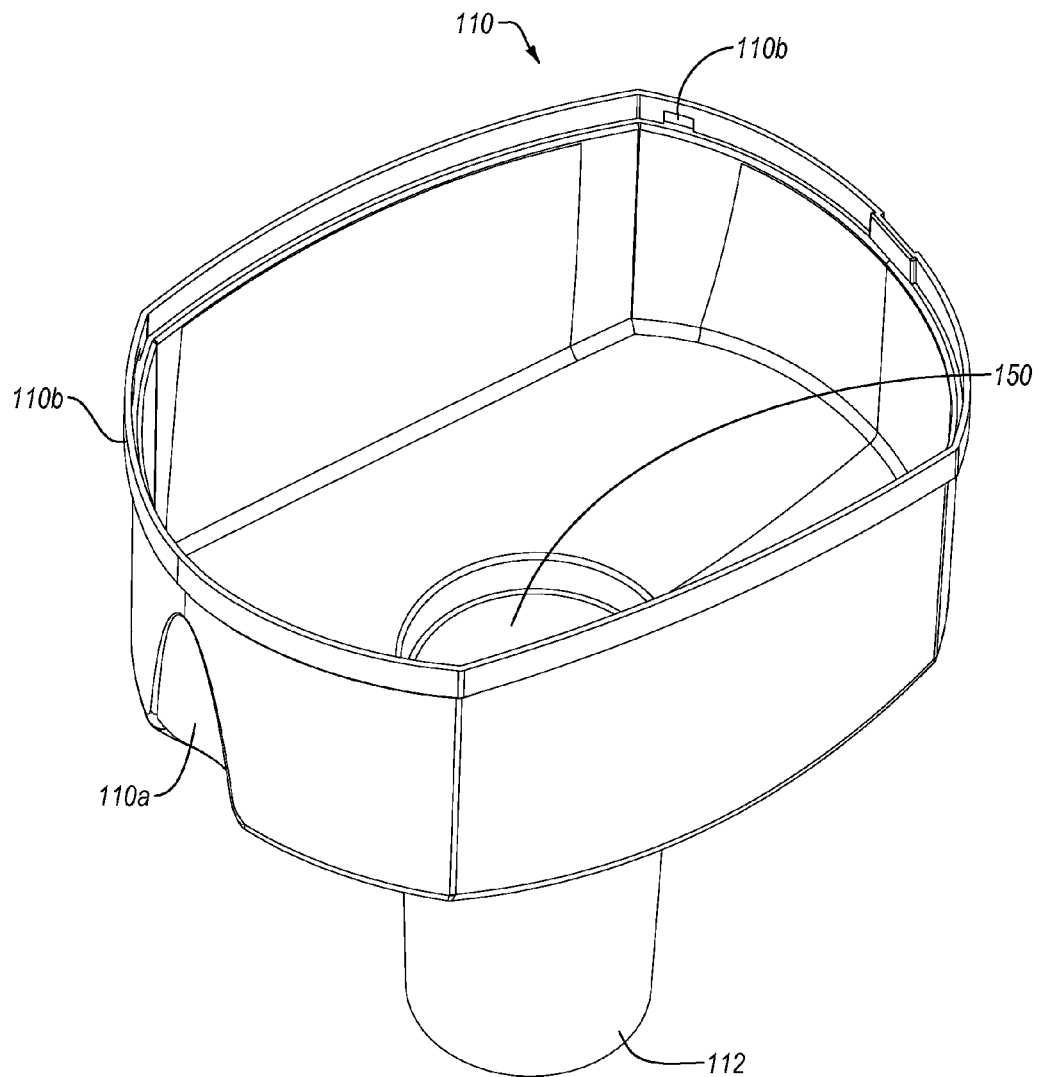
FIG. 1d is a top perspective view of an example untreated water reservoir configured to releasably connect to a cover.
Figure 1E:
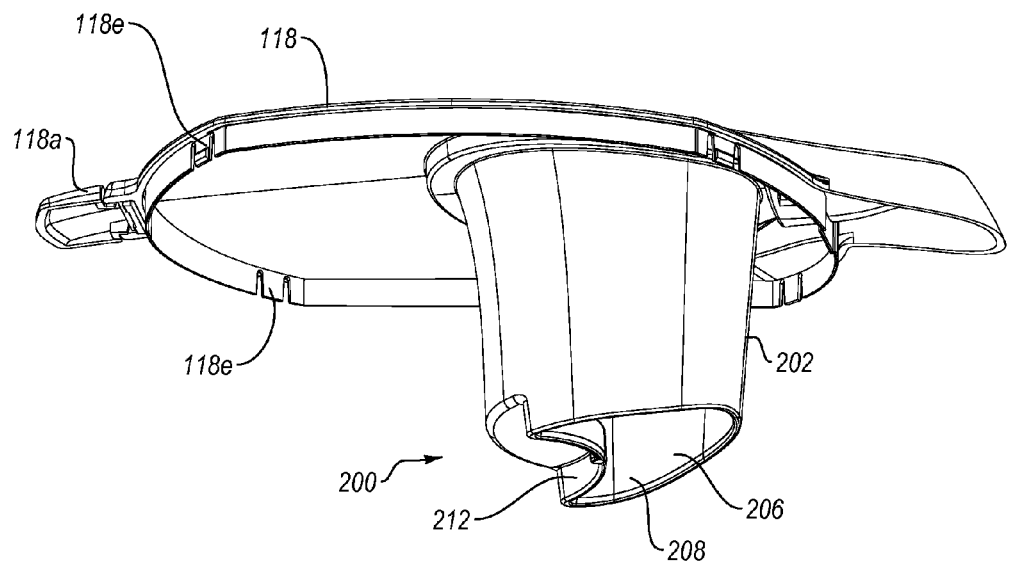
FIG. 1e is a bottom perspective view of an example cover and flume.
Figure 1F:
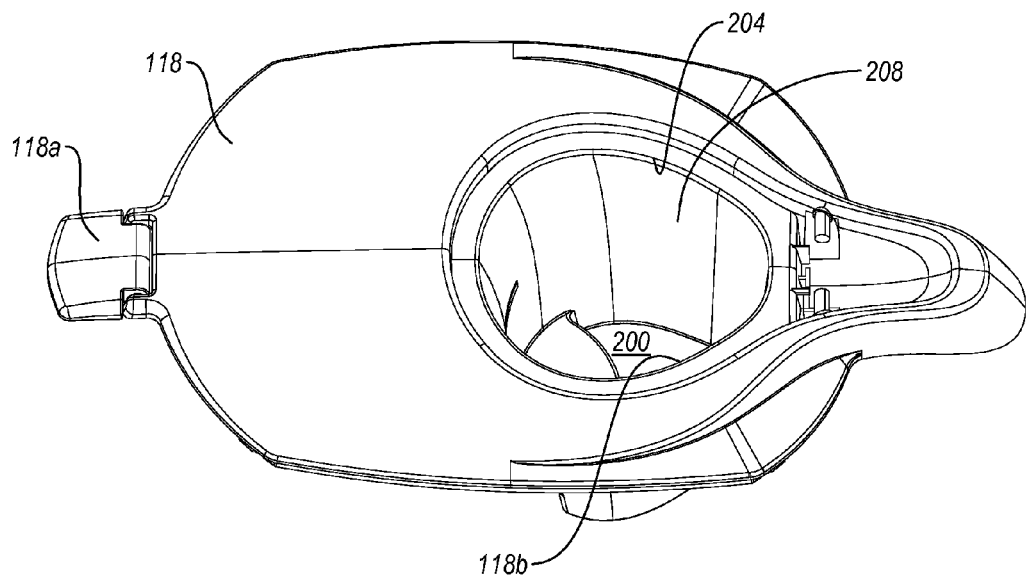
FIG. 1f is a top perspective view of an example cover and flume.
Figure 1G:
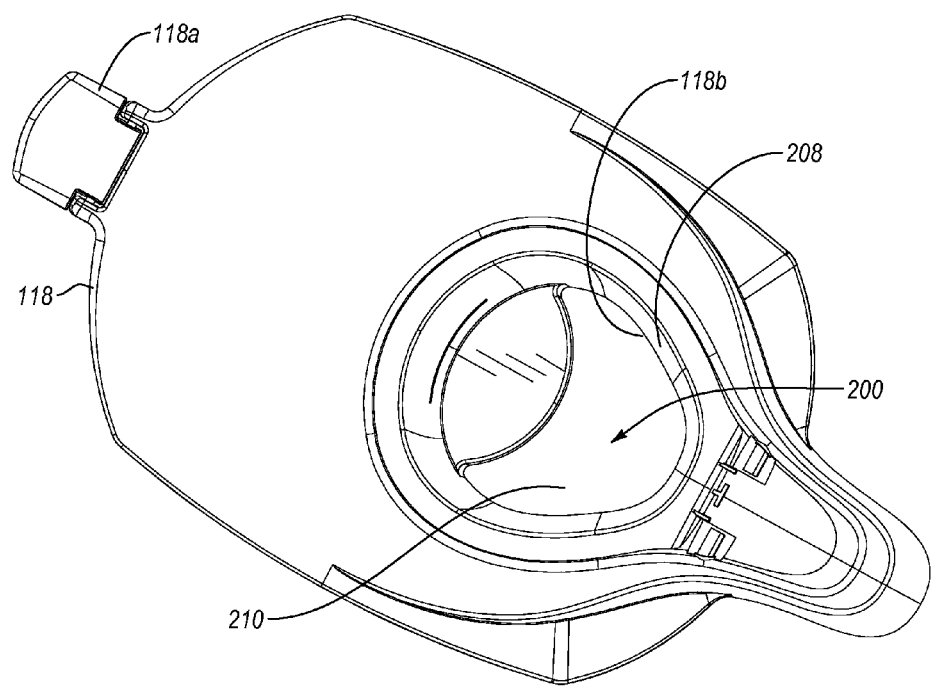
FIG. 1g is another bottom perspective view of an example cover and flume.
Figure 1H:
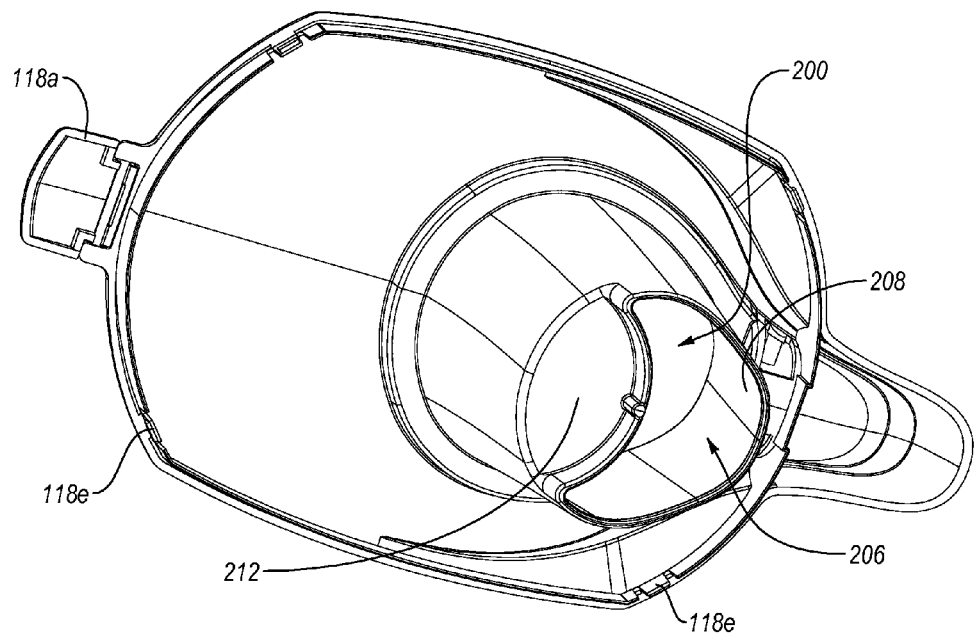
FIG. 1h is a further bottom perspective view of an example cover and flume.

Reference will now be made in detail to aspects of various embodiments of the present disclosure, examples of which are illustrated in the accompanying drawings. While described in conjunction with these embodiments, it will be understood that they are not intended to limit the disclosure to these embodiments.

In general, embodiments of the invention can be employed in a variety of different environments, one example of which is a water pitcher, although the scope of the invention is not limited to this example environment and extends, more generally, to any environment where such embodiments can be usefully employed. For example, embodiments of the invention can be employed with any water, or other fluid, container where it is desired to enable a user to reliably align and seat a filter cartridge.

A. Example Pitcher Configuration

Directing attention now to FIGS. 1*a*-1*i*, details are provided concerning an example fluid container in the form of a pitcher 100. The pitcher 100 includes a chassis 102 that defines an interior 104. The chassis 102 can be any suitable size or shape. A handle 106 attached to, or integrally formed with, the chassis 102 enables a user to grasp and operate the pitcher 100. Opposite the handle 106, a spout 108 is provided that is in fluid communication with the interior 104 of the chassis 102. In some embodiments, the chassis 102, handle 106 and spout 108 are integral with each other and thus have a unitary one-piece construction, which may be constructed of plastic and/or other suitable materials.

An untreated water reservoir 110 is removably disposed in the interior 104 of the chassis 102. In at least some embodiments, the untreated water reservoir 110 is configured to be removably received in the chassis 102. The inside dimension of the chassis 102 may be substantially the same as the exterior dimension of the untreated water reservoir 110, such that the untreated water reservoir 110 fits closely within the chassis 102. Thus positioned, and as indicated in FIG. 1*a*, the untreated water reservoir 110 occupies a portion of the interior 104 of the chassis 102. In general, the untreated water reservoir 110 serves to receive, and hold for a period of time, water from an external source. The untreated water reservoir 110 may include a recessed portion 110*a* that cooperates with the spout 108 to define a fluid passageway by way of which fluid can exit a treated water reservoir 114.

As further indicated in FIG. 1*a*, the untreated water reservoir 110 includes a hollow candle 112 that defines a receptacle within which a filter cartridge 150, comprising a granular and/or other filtering medium such as ion exchange resin (IER), can be removably positioned. The candle 112 is open at its upper end 112*a* and lower end 112*b* and, as such, is in fluid communication with the untreated water reservoir 110, as well as with the treated water reservoir 114, which comprises a portion of the overall interior 104 of the chassis 102. In general, the upper end 112*a* serves as a fluid inlet, and the lower end 112*b* serves as a fluid outlet. A filter seat 116 positioned near the upper end 112*a* of the candle 112 is configured to cooperate with the filter cartridge 150 in the candle 112 to form a seal such that water in the untreated water reservoir 110 can enter the treated water reservoir 114 only by passing through the filter cartridge 150.

The example water pitcher 100 also includes a cover 118. In general, the cover 118 extends over the untreated water reservoir 110 so that water does not escape from the untreated reservoir 112 when the water pitcher 100 is tilted.

The cover 118 may include various elements, including a spout cover 118*a* that is rotatably connected to the cover 118 and arranged to cover the spout 108 and help prevent foreign matter from entering the spout 108, while also enabling fluid to exit the spout 108. As well, the cover may include an opening 118*b* covered by lid 118*c* that is rotatably connected to the cover 118 and includes a thumb button 118*d* that, when pressed by a user, causes the lid 118*c* to rotate upward so that a user can pour fluid through the opening 118*b*, which communicates with the untreated water reservoir 110.

With continued reference to FIGS. 1*a*-1*f*, different embodiments of the cover 118 can mate with various other elements of the water pitcher 100, in a variety of different ways. For example, in some embodiments, the cover 118 simply rests on the chassis 102, but is not connected to the chassis 102, while in other embodiments, the cover 118 can be removably connected to the untreated water reservoir 112.

Where the cover 118 is configured to be removably attached to the untreated water reservoir 110, a variety of structures can be employed to this end. In at least some embodiments, the cover 118 and untreated water reservoir 110 include respective complementary structures that releasably engage each other so that the cover 118 and untreated water reservoir 110 can be securely connected to each other, but detached from each other when desired. In light of the foregoing, it will be appreciated that the example complementary structures disclosed herein are example structural implementations of a means for removably attaching the cover 118 and the untreated water reservoir 110 to each other. Any other structure(s) capable of providing comparable functionality can alternatively be employed and are considered as being within the scope of the invention.

As best shown in FIGS. 1*d*, 1*e*, 1*h* and 1*i*, the aforementioned complementary structures can take the form, for example, of one or more tabs 118*e* of the cover 118 that are configured to snap into respective detents 110*b* of the untreated water reservoir 112. As indicated, each tab 118*e* may have a free end that can be temporarily deflected so as to move into a corresponding detent 110*b*. To free the cover 118 from the untreated water reservoir 110, the free ends of the tabs 118*e* can be deflected sufficiently far that the tab 118*e* can move out of its respective detent 110*b*.

As further indicated in the Figures, particularly FIGS. 1*e*-1*i*, the example pitcher 100 can include a flume, one embodiment of which is denoted at 200. Following is a discussion of some general aspects of example flumes.

B. General Aspects of Some Example Flumes

It should be noted at the outset that the scope of the invention is not limited to the particular configuration, arrangement, and orientation of the flume 200 indicated in the Figures. Rather, the illustrated flume is provided as an example for illustrating various concepts underlying the general notion of a flume.

Consistent with the foregoing, a variety of other example flumes having various configurations, arrangements, and orientations are disclosed elsewhere herein. Examples of such alternate flumes include those referred to as constituting a "protrusion" in the United States provisional applications referenced, and incorporated, herein. In this regard, it should be noted that a flume can be used alone in connection with a fluid container, or in any combination with any other protrusion or filter management element disclosed in the aforementioned United States provisional applications and/or in the related applications referred to herein. These combinations of elements and devices are considered to be within the scope of the invention.

In general, embodiments of a flume can provide a variety of functions. By way of example, a flume may serve to perform any one or more of seating, aligning, and/or retaining a filter cartridge in a reservoir or other container, and directing fluid flow within the container. In at least some embodiments, the flume may implement multiple functionalities.

In view of the foregoing, it will be appreciated that the disclosed embodiments of a flume are example structural implementations of a means for performing any combination of a variety of different functions. These functions include, but are not limited to, directing fluid flow within a container, aligning a filter cartridge, seating a filter cartridge, retaining a filter cartridge in a sealing range. The scope of the invention is not limited to the example structures disclosed herein however and, instead, extends to any other structure (s) capable of performing any combination of the aforementioned functionalities. As well, the aforementioned means is not limited to such functionalities and may perform a variety of additional, or alternative, functions as well.

With reference to the aforementioned example functions, embodiments of a flume may serve to direct the flow of fluid within a container, such as a pitcher, bottle, jug or carafe for example. In at least some particular embodiments, the flume directs incoming water away from a filter cartridge and, particularly, the air vents of the filter cartridge. This functionality may, among other things, help to prevent, or at least attenuate, airlock and/or media disturbance.

Additionally, or alternatively, a flume may be provided within a fluid container and generally configured and arranged to transmit a force to an associated filter cartridge in a direction and magnitude such that, if the filter cartridge is not already properly seated on a filter seat of the container, the filter cartridge will be moved into a sealing range defined by the filter seat. The flume may directly contact the filter cartridge during a process to seat the filter cartridge within the sealing range, although that is not required and, alternatively, one or more intervening structures can be used to transfer a force exerted by the flume to the filter cartridge.

As well, the flume may serve to retain the filter cartridge within the sealing range. To perform this function, it is not necessary that the flume remain in contact with the filter cartridge once the filter cartridge is in the sealing range of the candle, although the flume may do so in some instances. More generally, the flume can be positioned in any location where it is able to prevent the filter cartridge from moving out of the sealing range. This can be accomplished either with the flume in contact with the filter cartridge, or with the flume spaced apart from the filter cartridge but positioned such that the filter cartridge is prevented by the flume from moving out of the sealing range.

Finally, some embodiments of a flume may help to align a filter cartridge in a candle or other receptacle. By way of example, the flume may be used to move a filter cartridge into substantial axial alignment with the candle or other receptacle. This alignment can be required, for example, when a filter cartridge is only partly received within the candle or other receptacle.

In general, and as will be evident from the various flume configurations disclosed herein, embodiments of the flume can take any form or configuration consistent with their function(s) and so are not constrained to any particular form or configuration, nor location relative to the filter cartridge or any other element of a fluid container. As well, the flumes need not take any particular configuration, orientation, or location. In terms of their overall composition, the example flumes disclosed herein can be made of any suitable materials, examples of which include, glass, plastic, elastomeric materials such as rubber, ceramic, composites, and metal, or any group of one or more of those.

B. Aspects of Some Example Flumes—Fluid Flow

Turning now to FIGS. 1e-1i, further details are provided concerning the example flume 200. In some embodiments, the example flume 200 may be integrally formed with, or otherwise connected to, the cover 118. In some instances, the flume 200 may be detachably connected to the cover 118 so that it can be removed and replaced if desired by a user. The flume 200 is configured to be substantially, or completely, received within the untreated water reservoir 110. As best indicated in FIG. 1x, the flume 200 can be sized and configured to be positioned proximate the filter cartridge 150 when the filter cartridge 150 is present in the candle 112.

In the illustrated example, the flume 200 includes a substantially hollow body 202 that includes an inlet 204, and an outlet 206 arranged for fluid communication with the untreated water reservoir 110 when the flume 200 is positioned as indicated in FIG. 1e-1i. The inlet 204 and outlet 206 may have about the same, or different, cross-section areas. In the example of FIGS. 1e-1i, the inlet 204 has a cross-section area that is larger than a cross-section area of the outlet 206. As well, the inlet 204 slopes from the front of the flume 200 downward toward the back of the flume 200, while the outlet 206 slopes in the opposite fashion, namely, downward from the back of the flume 200 toward the front of the flume 200.

Within the body 202, a plurality of flume surfaces 208 cooperate to define a fluid passage 210 that extends from the inlet 204 to the outlet 206. The flume 200 additionally includes a contact portion 212 located proximate the outlet 206 and engageable with the filter cartridge 150 such that when the contact portion 212 is engaged with the filter cartridge 150, a portion of the filter cartridge 150 engaged by the contact portion is located outside of the fluid passage 210. In general, the contact portion 212 can have any size, shape, configuration and/or orientation that enables it to perform any combination of the functions disclosed herein.

Figure 1I:
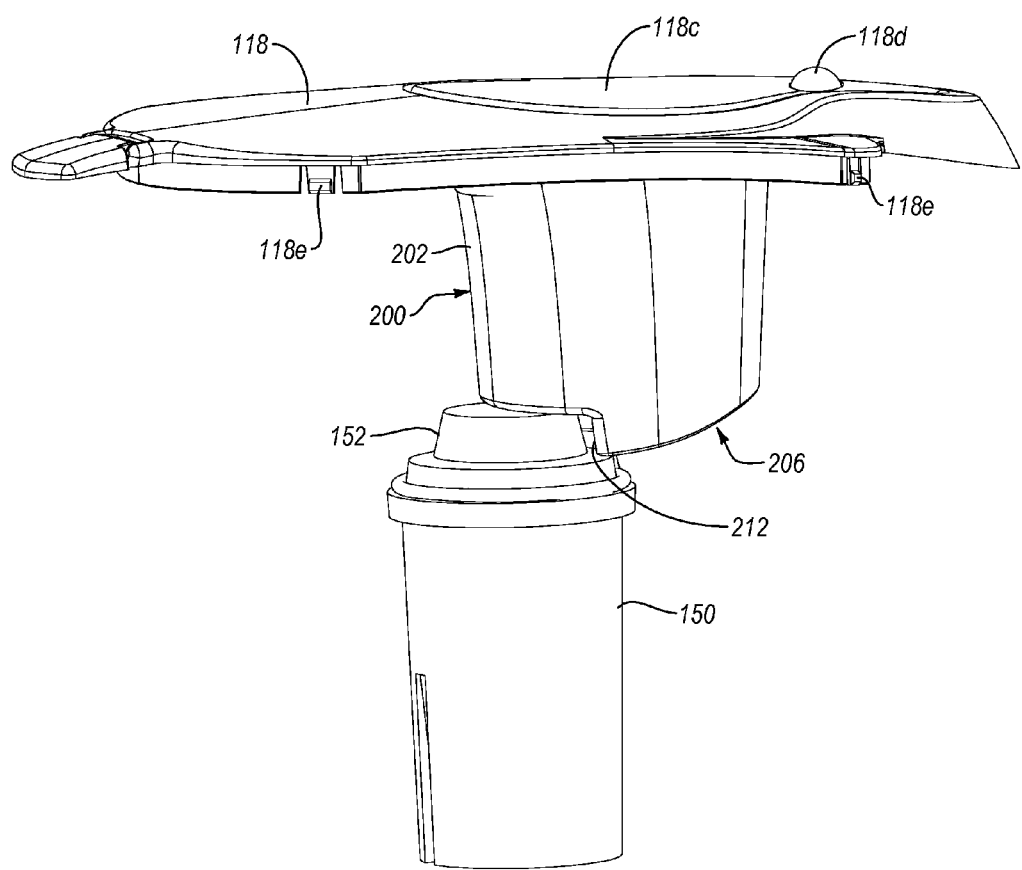
FIG. 1*i* is a side perspective view of an example cover and flume, and indicating an interface between the flume and a filter cartridge.

With regard to the particular flume 200, the contact portion 212 may configured to receive a portion of the filter cartridge 150, as best shown in FIG. 1i. The received portion of the filter cartridge 150 can be the air vent dome 152, but that is not required. When the portion of the filter cartridge 150 received by the contact portion 212 is the air vent dome 152, the flume 200 and filter cartridge can be arranged in the untreated water reservoir 110 in such a way that the contact portion 212 has no material effect on air flow from the air vent dome 152. Moreover, the configuration and arrangement of the flume 200 may be such that the flume 200 is able to direct incoming fluid away from the air vent dome 152 so as to prevent, or at least reduce, any airlock and/or media disturbance that might otherwise be experienced in the filter cartridge 150 as a result of the incoming water.

C. Aspects of Some Example Flumes—Filter Seating/Retention

As noted elsewhere herein, embodiments of a flume, such as the example flume 200, may perform a variety of different functions, examples of which include seating and retention of a filter cartridge. With continuing attention to FIGS. 1a-1i, and direction attention now as well to FIG. 2, further details are provided concerning various structures in connection with which embodiments of a flume may be employed. The various elements disclosed in FIG. 2 can, but need not, be the same or substantially the same as those disclosed in FIGS. 1a-1i.

Figure 2:
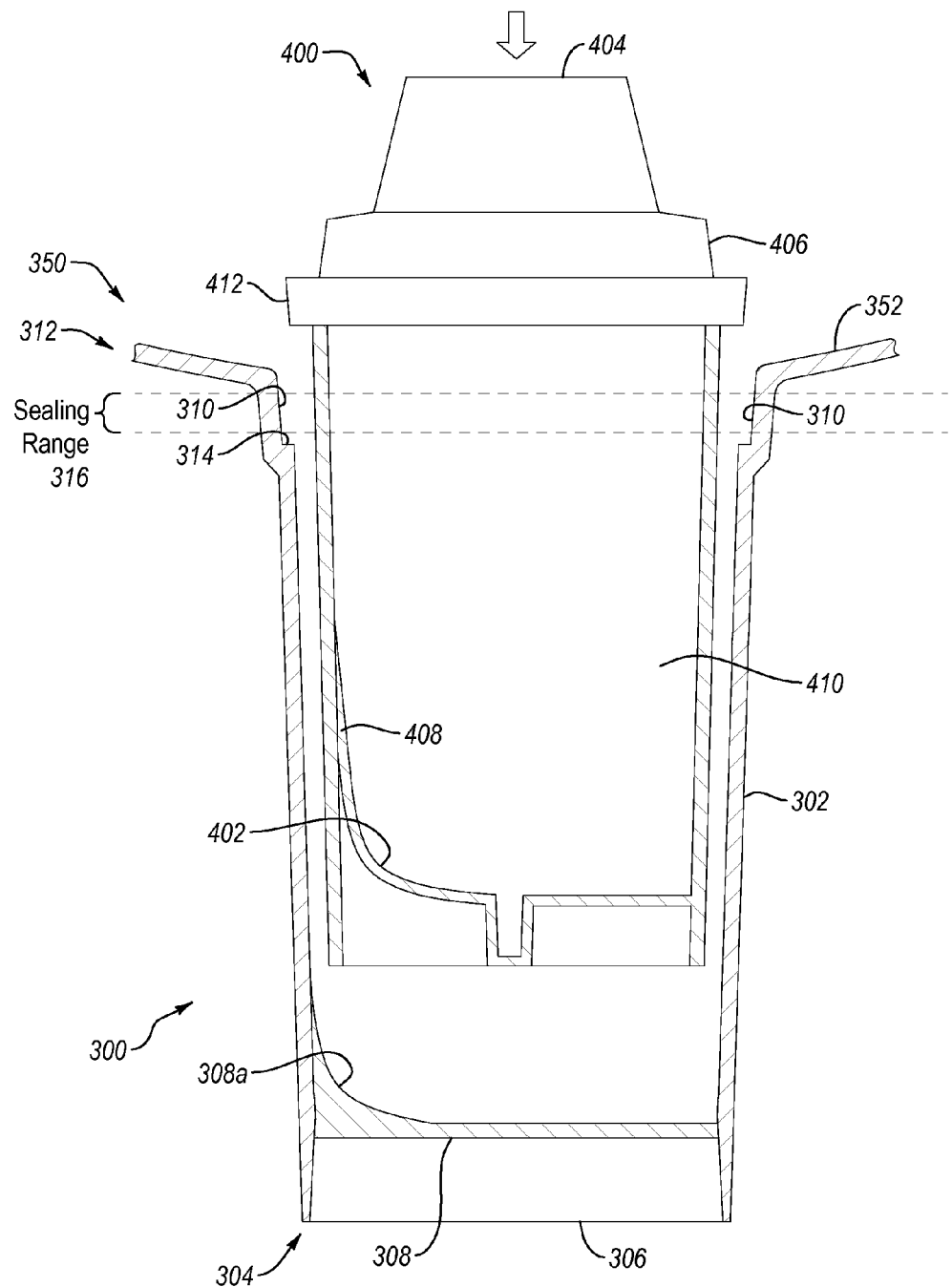
FIG. 2 is a section view of an example filter cartridge and candle.

In the illustrated example of FIG. 2, a candle 300 is provided that is part of an untreated water reservoir 350 and includes a generally tubular portion 302 that defines a receptacle, which may or may not be tapered to conform with the shape of the filter cartridge 400, that extends vertically downward from a bottom 352 of the untreated water reservoir 350, and the inside diameter of the generally tubular portion 302 is slightly larger than the outside diameter of the filter cartridge 400. The lower end 304 of the candle 300 includes a fluid outlet 306 that allows fluid to exit the candle 300 and enter a treated water reservoir (see, e.g., FIG. 1a).

An index structure 308, which can be located in the lower end 304 of the candle 300, can help to ensure proper rotational alignment of the filter cartridge 400 by engaging one or more complementary structures (see, e.g., FIG. 1b) on the bottom of the filter cartridge 400. For example, the index structure 308 can be configured with a web 308a that is configured to be received in a corresponding slot 402 of the filter cartridge 400 such that the filter cartridge 400 will only fit into the candle 300 in an orientation in which the web 308a is received in the slot 402.

An annular filter seat 310 is provided at an upper end 312 of the candle 350. In general, the filter seat 310 is configured to cooperate with the filter cartridge 400 to establish a seal that prevents, or at least substantially prevents, fluid in the unfiltered water reservoir 350 from bypassing the filter cartridge 400. With more particular reference to its configuration, the example filter seat 310 is angled, relative to vertical, and terminates in an annular shoulder 314 that serves to limit the extent to which the filter cartridge 400 can be inserted into the tubular portion 302 of the candle 300.

With continued reference now to FIG. 2, details are provided concerning the example filter cartridge 400. As shown, the filter cartridge 400 includes a top 404 that, as illustrated in the example of FIG. 1i, interfaces with a flume in order to promote proper seating of the filter cartridge 400 in the candle 300. The filter cartridge 400 also includes a fluid inlet section 406 comprising one or more inlet ports that enable fluid from the untreated water reservoir 350 to enter the filter cartridge 400 and pass into a media chamber 408 having an interior 410 that contains filtration media (not shown).

As discussed in more detail below, the filter cartridge 400 includes an annular sealing surface 412 which, in general, can be formed on the periphery of the filter cartridge 400. Thus, the position and orientation of the sealing surface 412 disclosed in FIG. 2 are provided by way of example only.

With more particular reference to the formation of the seal between the filter seat 310 and the filter cartridge 400, the configuration of the sealing surface 412 of the filter cartridge 400 and/or the configuration of the filter seat 310 can be such that the filter cartridge 400 can be acceptably sealed anywhere within a range of vertical positions of the sealing surface 412 relative to the filter seat 310.

That is, a sealing range 316 can be defined within which the sealing surface 412 and filter seat 310 cooperate to provide a seal adequate to prevent, or substantially prevent, water from bypassing the filter cartridge 400 when the filter cartridge 400 is properly positioned within the candle 300. Formation of an adequate seal between the sealing surface 412 and the filter seat 310 may be further facilitated by forming the sealing surface 412 and filter seat 310 at respective angles, which may or may not be the same, relative to vertical, and/or by constructing one or both of the sealing surface 412 and the filter seat 310 of a material, such as plastic, that is sufficiently compliant to permit some elastic deformation of one or both of the sealing surface 412 and the filter seat 310. Depending upon variables such as, but not limited to, the angle and vertical dimension of the sealing surface 412 of the filter cartridge 400, and the angle and vertical dimension of the filter seat 310, the length of the sealing range 316 can vary.

As well, where a seal is intended to be achieved by forming the sealing surface 412 and filter seat 310 at respective angles, the amount of contact area between those two elements can be controlled by selection of the respective angles, if one or both of those elements are compliant. To some extent at least, a relatively larger contact area may correspond to a relatively better and more stable seal than would be provided by a relatively smaller contact area.

With continued reference to FIGS. 1i and 2, details are provided concerning the relation between the flume 200 and filter cartridges 150 (FIG. 1i)/400 (FIG. 2). In the example embodiment of FIG. 1i, the flume 200 is positioned between the cover 118 of the water pitcher 100 and the top of the filter cartridge 150 such that when a user places the cover 118 in the fully closed position indicated in FIG. 1i, the cover 118 exerts a force "F" (see FIG. 2), either directly or indirectly, on the flume 200 that is then transferred by the flume 200 to the top of the filter cartridge 150. The exertion of this force moves the filter cartridge 150 into sealing contact with a filter seat, such as the filter seat 310 (see FIG. 2, and filter cartridge 400).

As shown in FIG. 1i, the flume 200 may remain in contact with the filter cartridge 150 even after the filter cartridge 113 is properly aligned and seated. This contact can be maintained, for example, by retaining the cover 118 in the fully closed position indicated in FIG. 1i. One useful aspect of this arrangement is that the filter cartridge 150 remains properly aligned and seated even when the water pitcher 100 is tipped. Thus, the user need not be concerned with bypass that could result if the filter cartridge 150/400 were to become misaligned or unseated.

Moreover, embodiments of the invention are configured and arranged to provide immediate and unambiguous feedback, such as sensory feedback, to the user if the filter cartridge 150/400 is not properly seated. With reference to the particular example of FIG. 2, the top of a sealing range 316 corresponds to the uppermost position in the candle 300 that the filter cartridge 400 can occupy that will still permit the cover 118 (see FIG. 1i) to be properly positioned or attached relative to the chassis 102. Thus, if the filter cartridge 150/400 is positioned out of, that is, above, the sealing range 316, the interposition of the flume 200 between the top of the filter cartridge 400 and the cover 118 (FIG. 1i) prevents the cover 118 from being properly positioned on, or attached to, the untreated water reservoir 350. The inability to position or attach the cover 118 signifies to the user that the filter cartridge 150/400 is out of position and must be pushed down into the sealing range 120a. As explained above, a downward force can be exerted by the flume 200 to this end and/or the user can exert a downward force on the filter cartridge 150/400 manually.

Thus, not only is the problem of an improperly positioned filter cartridge immediately visually apparent to the user, but the solution of moving the filter cartridge downward into the sealing range immediately and naturally occurs to the user. This is true even if the user does not necessarily understand that by moving the filter cartridge in this way, a seal between the filter cartridge and the candle is thereby established.

Thus, assurance is provided to the user that when the cover is fully closed, the filter cartridge is properly seated and, as such, unfiltered water cannot bypass the filter. In connection with this and other embodiments, one or more components of the water pitcher can be configured to provide sensory feedback to the user so that the user can ascertain proper seating of the filter cartridge.

For example, and as noted earlier, the cover 118 can include structures such as tabs 118e (see, e.g., FIG. 1i), for example, that engage complementary structures, such as detents 110a for example, on the untreated water reservoir 110 (see, e.g., FIG. 1d) so that a snap sound is produced when the cover is securely attached to the unfiltered water reservoir. This cover configuration can also help to ensure that the cover remains closed, thereby maintaining the filter cartridge in the correct position and alignment, even when the water pitcher is tipped.

More generally, sensory feedback, which includes any feedback perceptible by one of the senses of a user, can be employed in connection with various embodiments of the invention. Among other things, one or more types of sensory feedback can be used, alone or in combination, to indicate to a user when a filter is properly aligned and/or seated in a candle.

D. Further Example Flume Embodiments

Directing attention now to FIGS. 3a-5b, details are provided concerning various alternative embodiments of a flume. In general, and as noted elsewhere herein, a flume can have any configuration that is consistent with the functionality that it is intended to perform, where such functionality can include any one or more of seating, aligning, and/or retaining a filter element in a reservoir or other container and, directing fluid flow within the container. Thus, the alternative embodiments of FIGS. 3a-5b are presented solely by way of example. Except as may be noted below, the flumes of FIGS. 3a-5b may be similar, or identical, to the flume 200.

Figure 3A:
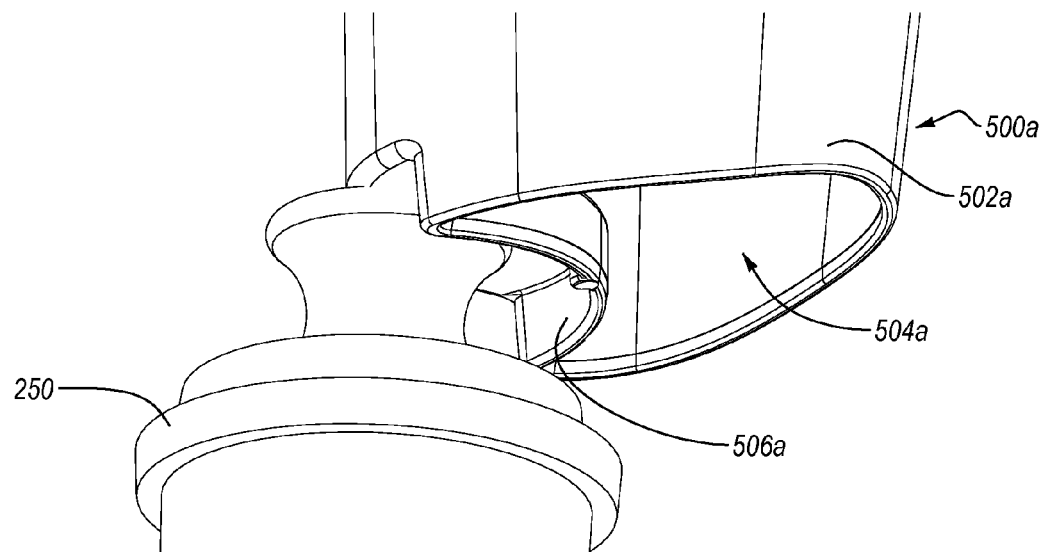
FIGS. 3*a*-5*b* are bottom perspective views of portions of various embodiments of a flume.

With particular attention first to FIG. 3a, a portion of a flume 500a is illustrated that includes a substantially hollow body 502a that has a generally semicircular cross-section shape. The body 502a defines an outlet 504a with a similarly shaped cross-section. As in the case of all the flume embodiments disclosed herein, the size, shape, and location of the outlet in a flume can vary from one embodiment to another. As well, more than one outlet can be provided in a single embodiment, and such outlets can be located on the front, rear, and/or one or more sides of the flume.

As indicated in FIG. 3a, the body 502a also defines a contact portion 506a whose shape is generally complementary to a shape of an associated filter cartridge 250a. The contact portion 506a is sized and configured to contact, at least temporarily, the filter cartridge 250a in some circumstances, such as when the flume 500a moves the filter cartridge 250a into a sealing range. The contact portion 506a may, or may not, be in contact with the filter cartridge 250a after the filter cartridge 250a resides in the sealing range. These same considerations can inform the configuration and arrangement of the respective contact portions of the flumes disclosed in FIGS. 3a-5b and as such, those contact portions are not specifically addressed in the discussion of those Figures.

Figure 3B:
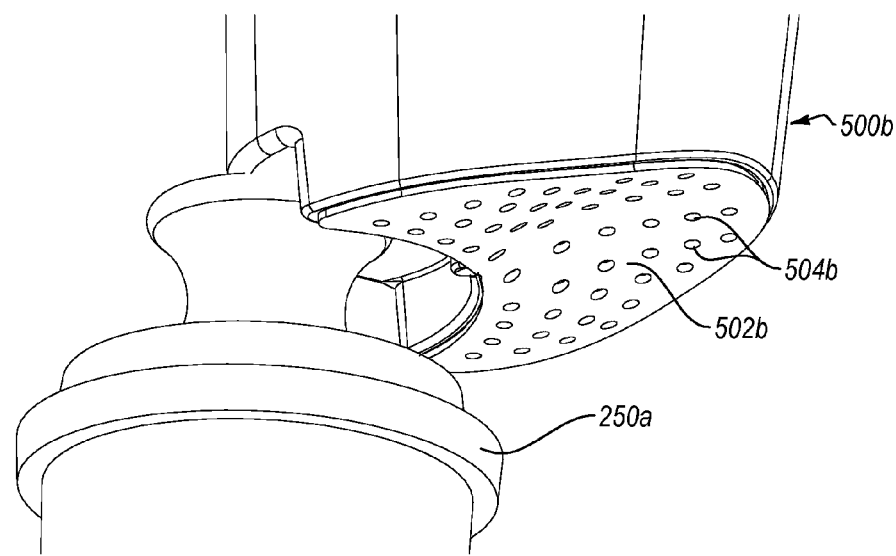

Turning now to FIG. 3b, a portion of a flume 500b is disclosed that is generally similar to flume 500a. In contrast with flume 500a however, flume 500b includes a floor 502b that includes a plurality of perforations 504b. The perforations 504b collectively form an outlet of the flume 500b. Aspects such as the size, number, shape, and distribution of the perforations 504b can be implemented as required to enable one or more of the functionalities disclosed herein.

Where employed, the perforations 504b may help to reduce a flow rate out of the flume 500b to an extent that fluid impingement on one or more portions of the filter cartridge 250 is reduced, or minimized. This relative reduction in flow rate can thus help to avoid media disturbance and/or airlock, but the extent to which the flow rate is reduced may have to be balanced against other considerations, such as the need to provide a satisfactory experience, namely, an adequate flow rate, to a user.

Figure 4A:
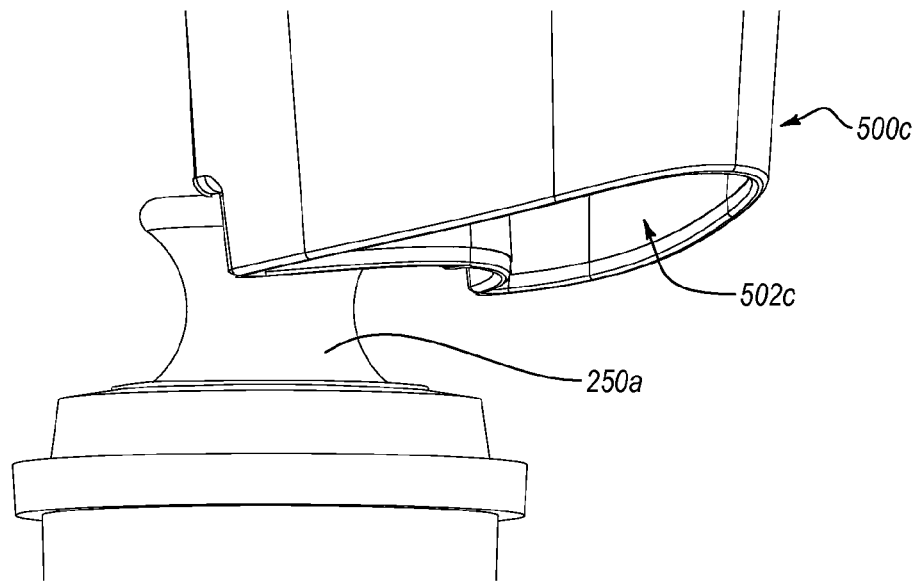

With reference now to FIG. 4a, another embodiment of a flume, denoted at 500c, is disclosed. The flume 500c is generally similar to the flume 500a, at least in terms of the nature of the outlet 502c which is open, rather than having a construction like that of the flume 500b. However, the outlet 502c is generally elongate in form, and tapers from a relatively wider portion near the filter cartridge 250a to a narrow, truncated configuration at the opposing end.

Figure 4B:
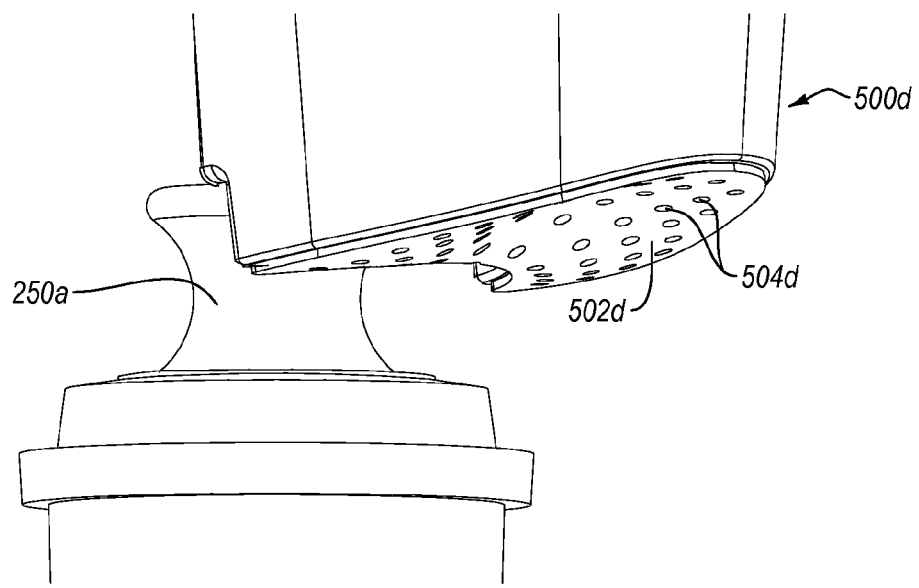

The flume 500d in FIG. 4b is similar in terms of its shape to the flume 500c. In contrast with that embodiment however, the flume 500d includes a floor 502d that includes a plurality of perforations 504d. As such, the considerations noted above in the discussion of the flume 500b apply as well to flume 500d.

Figure 5A:
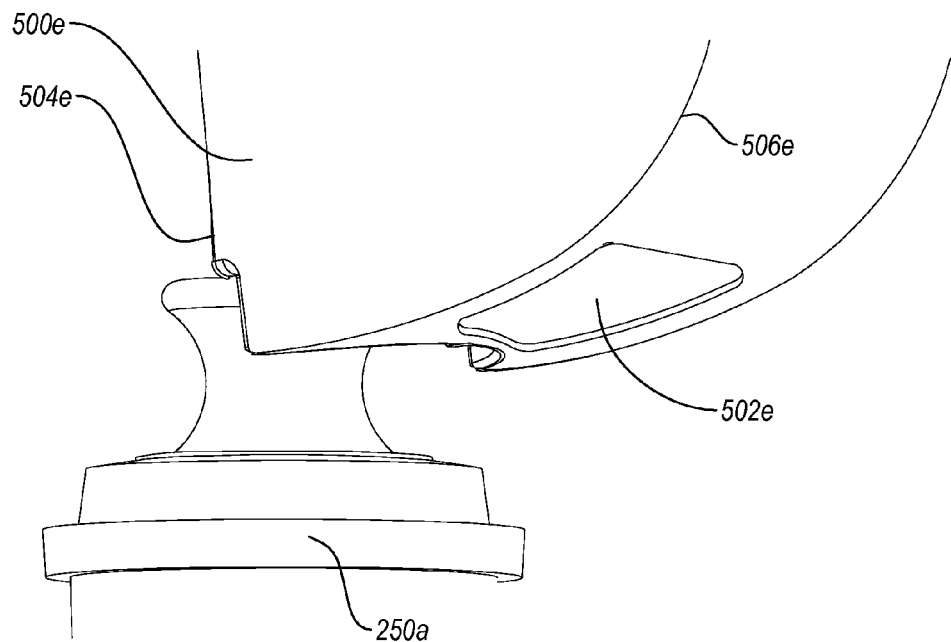

With reference now to FIG. 5a, another embodiment of a flume, denoted at 500e, is disclosed. The flume 500e is generally similar to flumes 500a and 500c, at least in terms of the nature of the outlet 502e which is open, rather than having a construction like that of the flumes 500b and 500d. However, the overall shape of the flume 500e is somewhat different from that of the flumes 500b and 500d in that, for example, the flume 500e has a general vertical front surface 504e that extends downward and intersects with a curved rear surface 506e. The outlet 502e is situated at the lower end of the curved rear surface 506e, although the outlet 502e could be located elsewhere on the flume 500e.

Figure 5B:
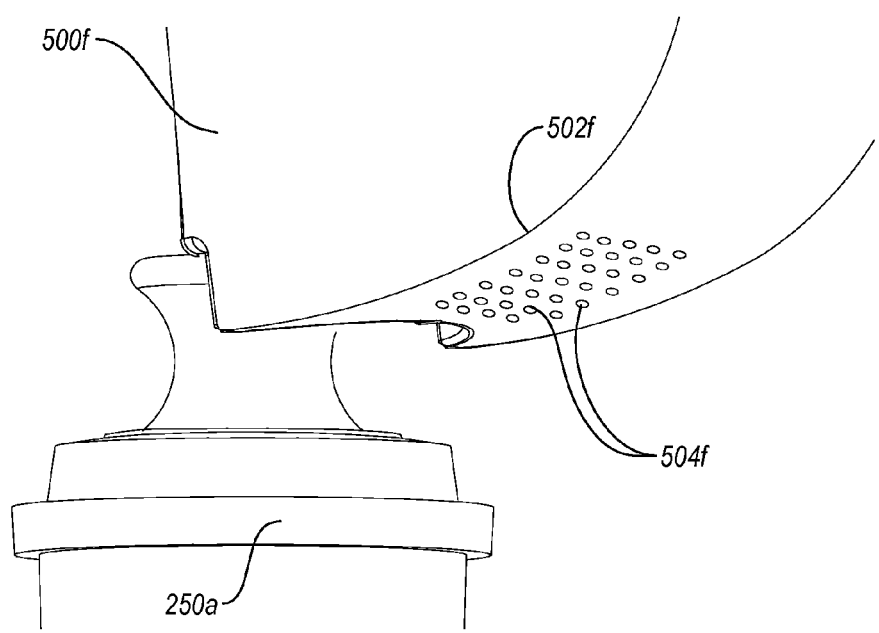
Figure 6A:
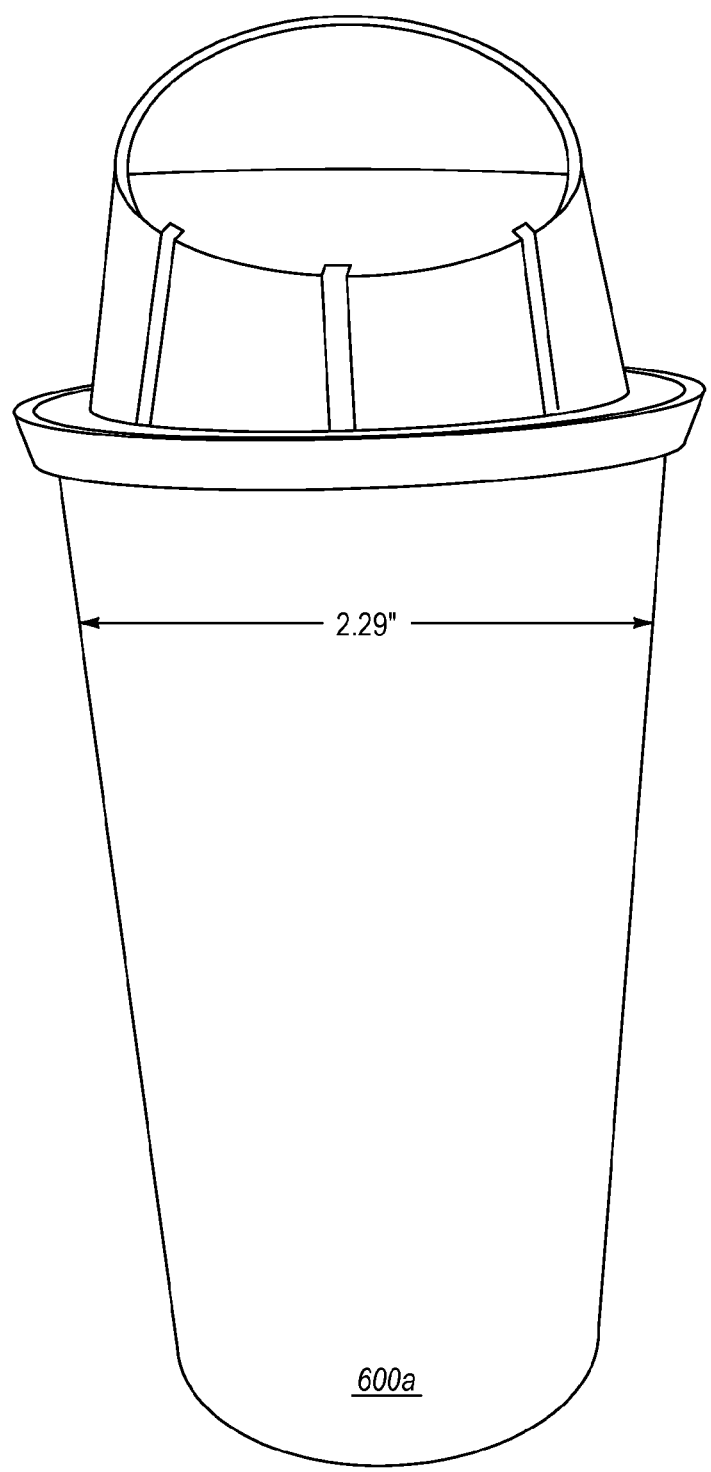
FIGS. 6*a*-6*g* are side views of example filter cartridges that can be employed with various embodiments of a flume.
Figure 6B:
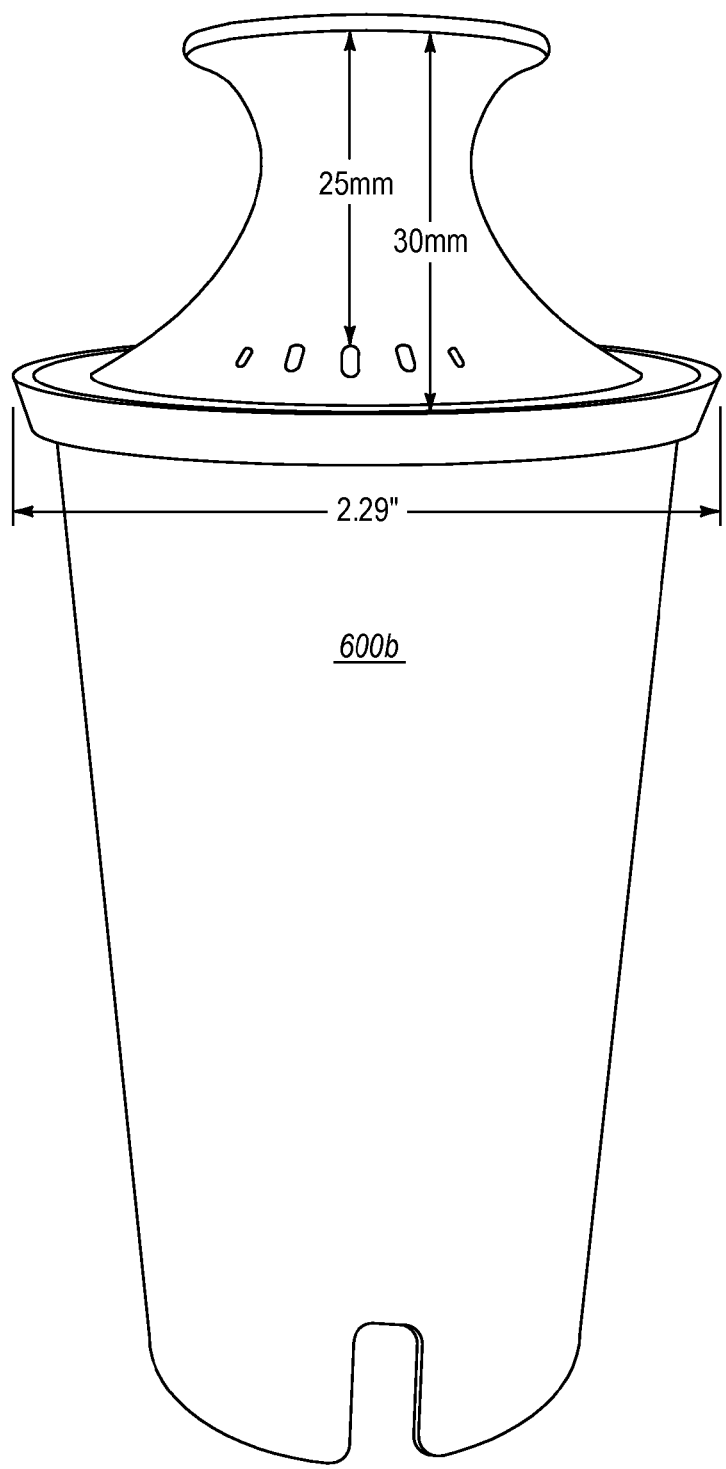
Figure 6C:
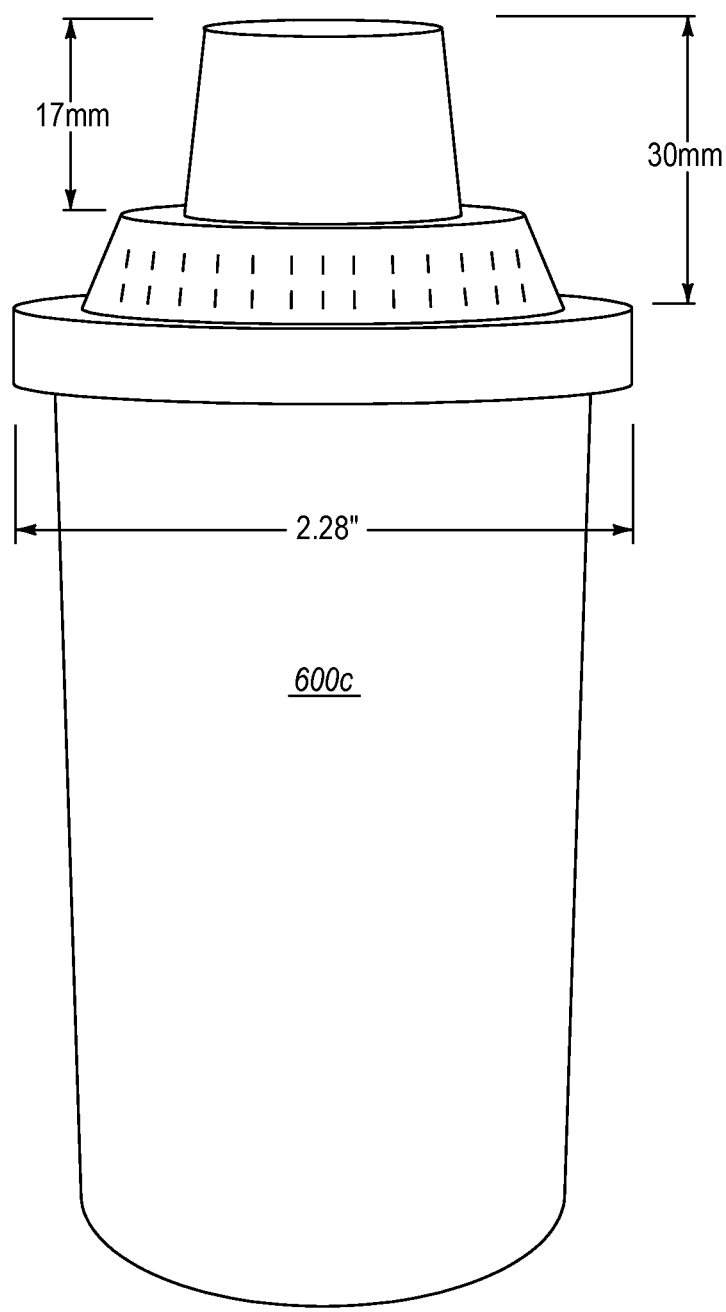
Figure 6D:
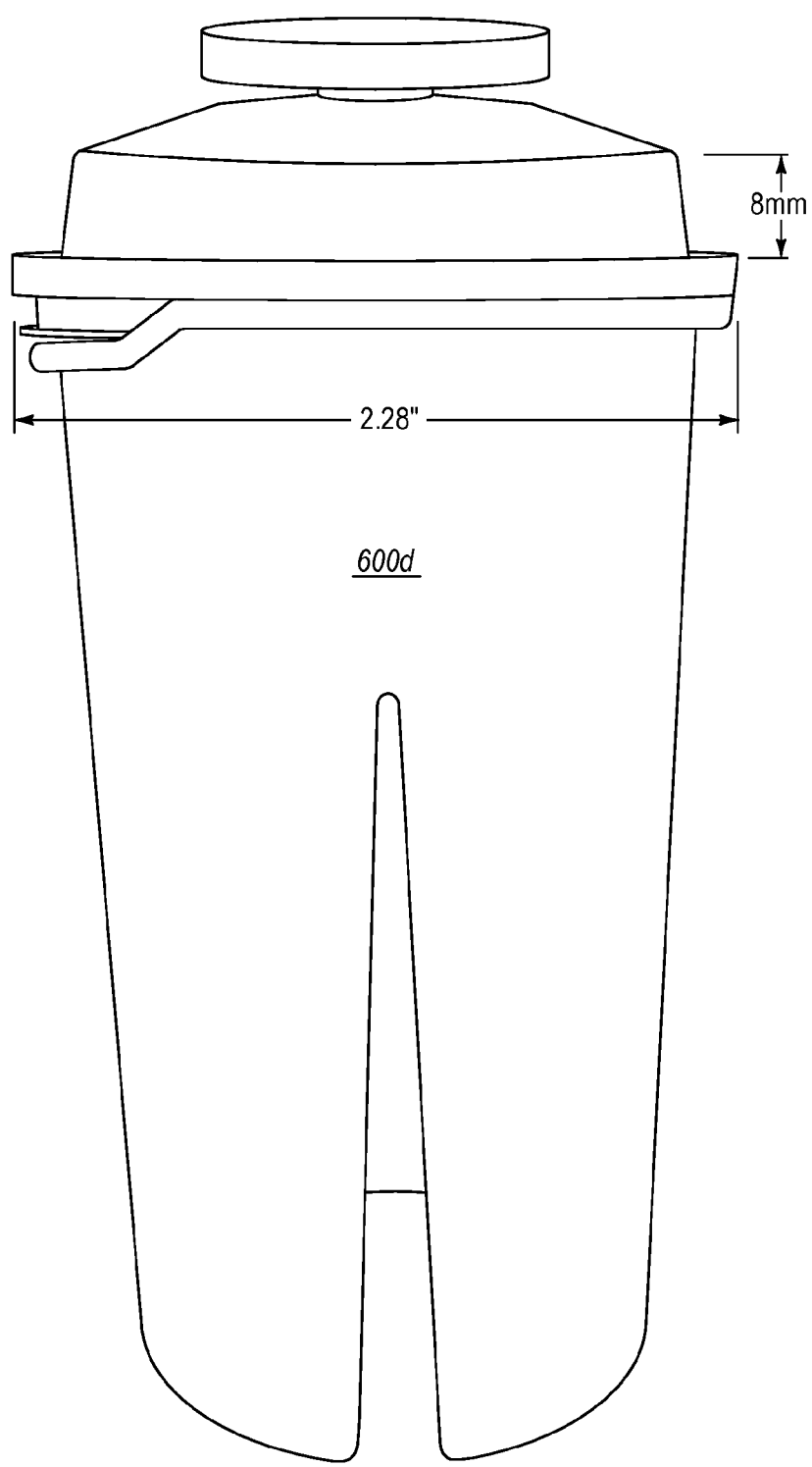
Figure 6E:
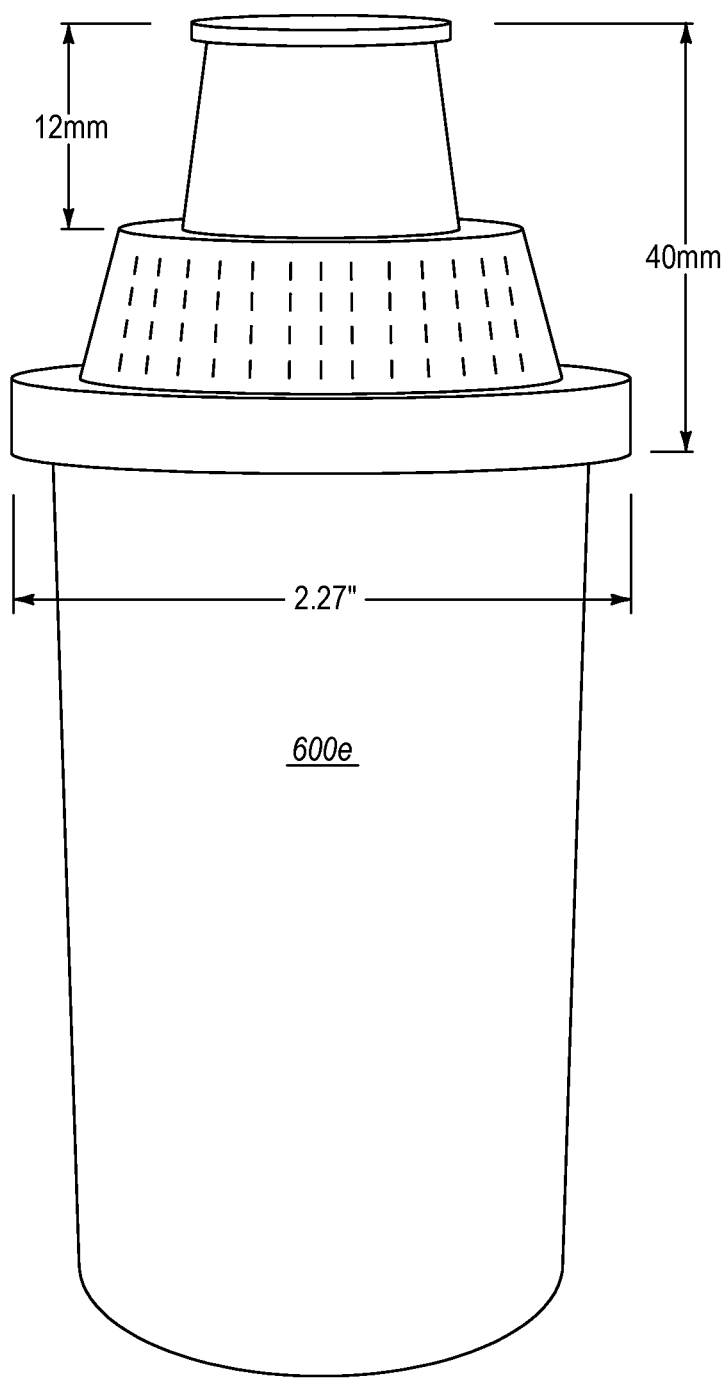
Figure 6F:
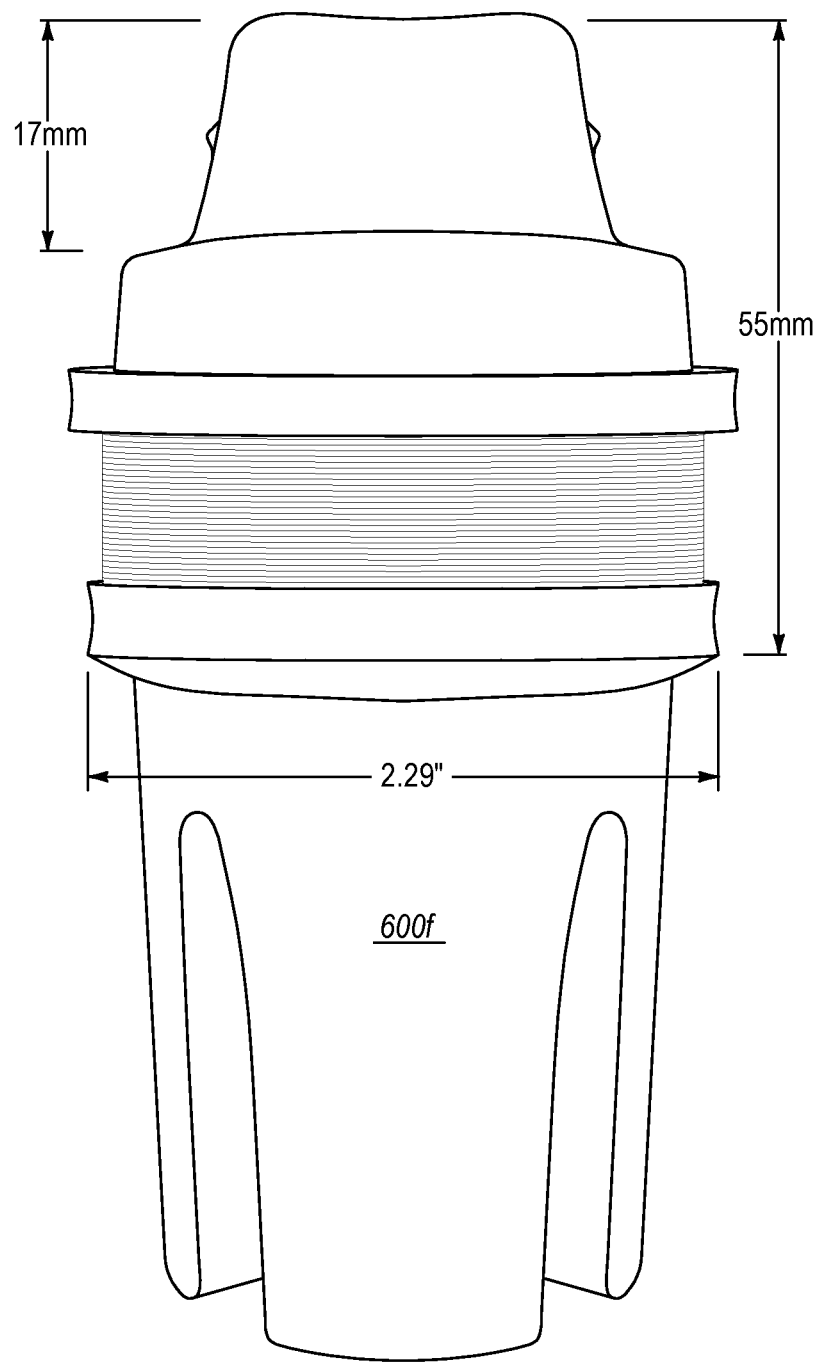
Figure 6G:
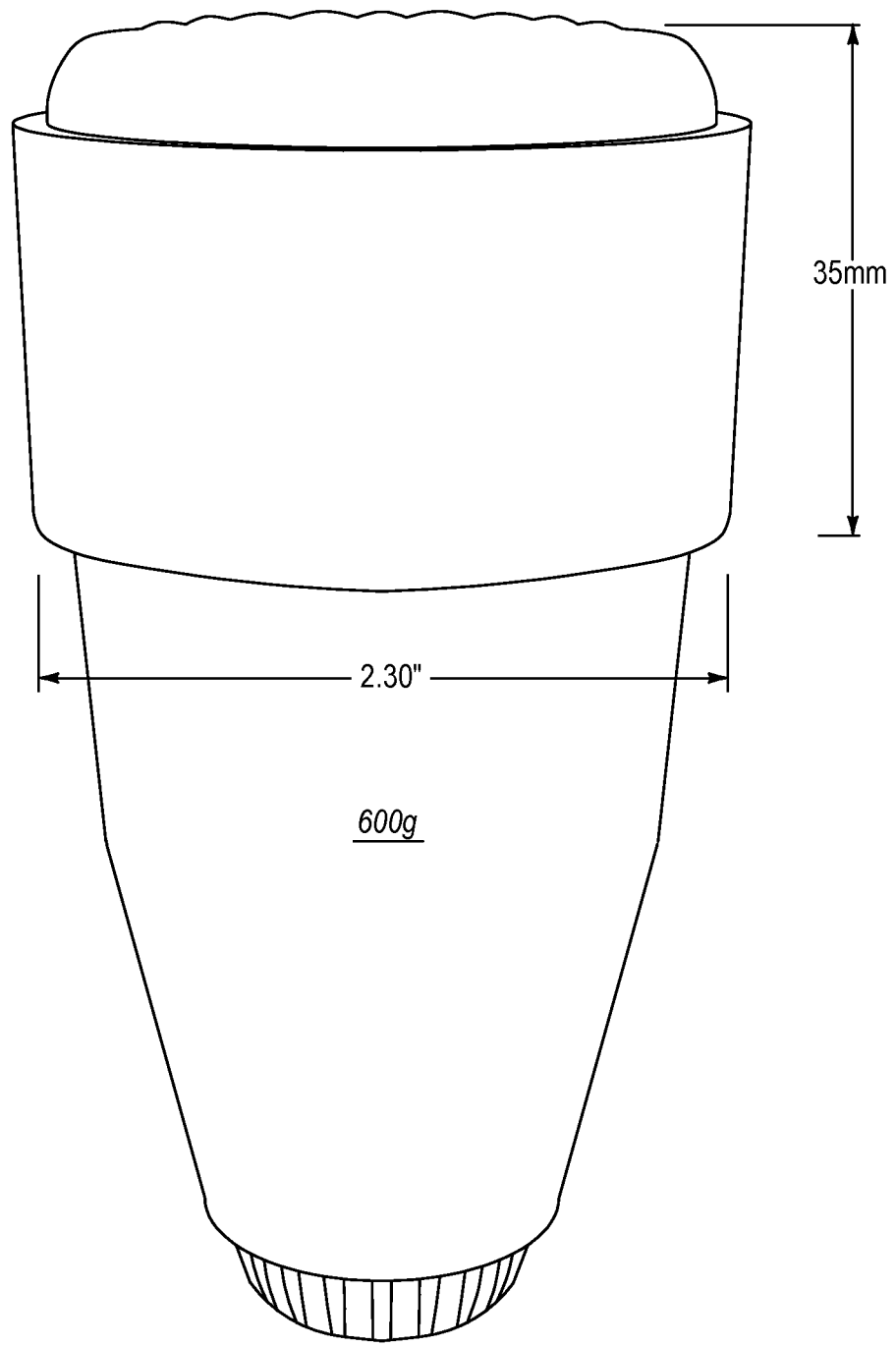

The flume 500f in FIG. 5b is similar in terms of its shape to the flume 500e. In contrast with that embodiment however, a lower portion of the curved rear surface 502f includes a plurality of perforations 504f. As such, the considerations noted above in the discussion of the flumes 500b and 500d apply as well to flume 500f. It should be noted, that as in the case of flumes 500b and 500d, additional or alternative groups of perforations can be provided at any other location of the flume including, for example, the front portion nearest the filter cartridge 250a, the rear, and/or one or both of the sides.

E. Example Filter Cartridge Configurations

Turning finally to FIGS. 6a-6g, examples of various filter cartridge configurations are disclosed. In particular, at least some embodiments of a flume are configured and arranged such that, in operation, those embodiments can effect movement of one or more of the filter cartridges 600a-600g into a sealing range of an associated candle, as well as retention of the filter cartridges once the filter cartridges are positioned in the sealing range. Thus, embodiments of the invention are not constrained for use with any particular filter cartridge configuration(s).

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed:

1. A flume suitable for use in connection with a filter cartridge of a water filtration system, comprising:
   a substantially hollow body including an inlet and an outlet;
   a plurality of flume surfaces within the substantially hollow body, wherein the flume surfaces cooperate to at least partly define a fluid passage extending from the inlet to the outlet, and wherein one of the flume surfaces curves continuously from an uppermost edge of the inlet down to a location between the uppermost edge of the inlet and a lowermost edge of the outlet; and
   a contact portion having a stepped configuration and located proximate the outlet, wherein the stepped configuration of the contact portion includes a laterally extending planar surface and a curved wall that is disposed about part of a perimeter of the planar surface and extends downward away from the planar surface, wherein the curved wall defines a laterally outwardly facing concave surface, and the contact portion is configured and arranged such that fluid cannot flow through the contact portion.

2. The flume as recited in claim 1, wherein the contact portion has a shape that is complementary to a shape of a portion of a filter cartridge.

3. The flume as recited in claim 1, wherein the flume is releasably engageable with an untreated water reservoir of a pitcher.

4. The flume as recited in claim 1, wherein a cross-section area of the inlet is larger than a cross-section area of the outlet.

5. A cover that includes the flume as recited in claim 1, wherein the cover includes one or more structural elements that releasably engage one or more respective complementary structural elements of a portion of a pitcher, wherein the portion of the pitcher comprises either a chassis of a pitcher or an untreated water reservoir of a pitcher.

6. The flume as recited in claim 1, wherein a forward-most wall portion of the flume stops short of a bottom edge of the flume, and a rearward-most wall portion of the flume extends to the bottom edge of the flume.

7. The flume as recited in claim 1, wherein a perimeter of the flume has a non-circular shape.

8. The flume as recited in claim 1, wherein a portion of the outlet is defined by an outermost wall of the flume.

9. The flume as recited in claim 1, wherein the inlet of the flume is non-circular in shape.

10. The flume as recited in claim 1, wherein an outer wall of the flume varies in height.

11. The flume as recited in claim 1, wherein one of the flume surfaces slopes continuously from the uppermost edge of the inlet down to the lowermost edge of the outlet.

12. The flume as recited in claim 1, wherein a perimeter of the outlet includes both a convex portion and a concave portion.

13. The flume as recited in claim 1, wherein an open area of the outlet has a size that is relatively larger than a size of the laterally extending planar surface.

14. The flume as recited in claim 1, wherein less than all of the perimeter of the laterally extending planar surface is bounded by the curved wall.

15. The flume as recited in claim 1, wherein one of the flume surfaces curves continuously from the uppermost edge of the inlet down to the stepped portion.

* * * * *